United States Patent
Zhang et al.

(10) Patent No.: US 12,548,628 B2
(45) Date of Patent: Feb. 10, 2026

(54) SLOW-CHARGE-LOSS TRACKING USING FEEDBACK-CONTROL LOOP

(71) Applicant: Micron Technology, Inc., Boise, ID (US)

(72) Inventors: Lei Zhang, Singapore (SG); Sampath Ratnam, San Jose, CA (US); Steven Michael Kientz, Westminster, CO (US)

(73) Assignee: Micron Technology, Inc., Boise, ID (US)

( * ) Notice: Subject to any disclaimer, the term of this patent is extended or adjusted under 35 U.S.C. 154(b) by 66 days.

(21) Appl. No.: 18/583,197

(22) Filed: Feb. 21, 2024

(65) Prior Publication Data

US 2024/0282390 A1    Aug. 22, 2024

Related U.S. Application Data (60) Provisional application No. 63/447,558, filed on Feb. 22, 2023.

(51) Int. Cl.
*G11C 7/00* (2006.01)
*G11C 16/26* (2006.01)
*G11C 16/34* (2006.01)

(52) U.S. Cl.
CPC ......... *G11C 16/3404* (2013.01); *G11C 16/26* (2013.01); *G11C 16/349* (2013.01)

(58) Field of Classification Search
CPC ..... G11C 7/1051; G11C 7/22; G11C 7/10-72; G11C 7/1006; G11C 7/1066
USPC ..................................... 365/189.15
See application file for complete search history.

(56) References Cited

U.S. PATENT DOCUMENTS

2018/0197619 A1* 7/2018 Chen .................... G11C 11/5628
2020/0133528 A1* 4/2020 Sheperek ............. G06F 3/0655

* cited by examiner

*Primary Examiner* — Xiaochun L Chen
(74) *Attorney, Agent, or Firm* — Schwegman Lundberg & Woessner, P.A.

(57) ABSTRACT

Various embodiments use a feedback-control loop to track slow charge loss (SCL) for a memory cell of a memory device, which can be used to adjust one or more read level voltages used to read data from the memory cell.

19 Claims, 8 Drawing Sheets

SLOW-CHARGE-LOSS TRACKING USING FEEDBACK-CONTROL LOOP

PRIORITY APPLICATION

This application claims the benefit of priority to U.S. Provisional Application Ser. No. 63/447,558, filed Feb. 22, 2023, which is incorporated herein by reference in its entirety.

TECHNICAL FIELD

Embodiments of the disclosure relate generally to memory devices and, more specifically, to using a feedback-control loop to track slow charge loss (SCL) for a memory cell of a memory device, which can be part of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Memory devices, such as those comprising one or more replacement gate (RG)-based memory cells, experience slow charge loss (SCL). Due to the effects of SCL, which is usually a function of time and temperature, certain RG-based memory cells (such as RG-based triple-level cells (TLC), which store 3 bits per cell) have their highest voltage threshold (Vt) distributions losing charge quite rapidly, especially relative to floating gate (FG)-based memory cells programmed at similar levels. Generally, all the Vt distributions lose charge, but lower Vt distributions do so at a significantly reduced rate. Tracking SCL of one or more memory cells is crucial to avoiding excessive latency impact, which can be caused by unnecessary error handling that results from incorrect read level placement (which can occur if a read level voltage is placed without considering SCL effect on Vt distributions).

Traditional methods for SCL tracking perform periodic, proactive scans of blocks (comprising memory cells) and classify measured voltage threshold offsets of scanned blocks into the predefined bins. Blocks with similar SCL characteristics can be grouped together in a bin to improve the management efficiency. However, traditional methods for SCL tracking suffer several drawbacks. For instance, traditional methods for SCL tracking lack balance between performance impact and scan resolution. Traditional methods for SCL tracking are usually performed as a foreground process, and separate from host activity (e.g., host read and write operations) and thus competes for system resources when host activity is intensive. Various embodiments described herein can cure these and other deficiencies of conventional technologies.

Aspects of the present disclosure are directed to using a feedback-control loop to track slow charge loss (SCL) for a memory cell of a memory device, which can be part of a memory sub-system, and which can be used to adjust one or more read level voltages (also referred to herein as, "read levels") used to read data from the memory cell. In particular, some embodiments provide for a closed-loop control system, or a feedback-controller, for tracking SCL with respect to one or more memory cells of a memory device. The SCL tracking provided by various embodiments can determine placement or adjustment of read level voltages for the one or more memory cells (of a memory device) over time.

According to some embodiments, a feedback-controller-loop-based slow-charge-loss tracking method is used to track SCL with respect to one or more memory cells of a memory device (e.g., a NAND-based memory device), where the memory device and its related decoder can be treated as a plant of the feedback-controller loop, and a memory controller (e.g., memory sub-system controller or media controller) that is operably coupled to the memory device can implement a feedback controller of the feedback-controller loop. Metrics that measure decode quality (by the decoder) or measure the decode characteristics can be treated as system error of the feedback-controller loop. Placement of one or more read levels of a memory cell (by the feedback controller) can serve as a set point for the feedback-controller loop. With these elements of the feedback-controller loop, the feedback-controller loop can establish a closed-loop control system that can actively and continuously press down the system error by adjusting placement of read level voltages. Accordingly, some embodiments operate on the understanding that read level voltages have a relationship to certain decoder quality measures, and that the relationship is dynamic based on various factors like SCL, data retention, external temperature, read disturb, and the like. Some embodiments group certain blocks into a system to balance the implementation complexity and control efficiency. Depending on the embodiment, operations of the feedback-controller loop can be performed as part of a read operation performed on a memory cell, which may be performed at the request of a host (e.g., piggy-back off of host read requests to minimize performance overhead), or according to a schedule (e.g., predetermined cadence) that ensures SCL is tracked for the memory cell even when the memory cell has not been accessed in a while (e.g., when the memory cell is part of a "cold" block, which is a block that has not been accessed for more than a predetermined amount of time).

The SCL tracking method of various embodiments can use less memory and can have less performance overhead than traditional methods of SCL tracking (which can involve maintaining a mapping table of blocks-to-bins). The low overhead of various embodiments can make it possible to track SCL more frequently and with finer granularity than traditional method of SCL tracking. Additionally, for some embodiment, a properly defined error function and a feedback controller with proper bandwidth enables the feedback-controller-loop-based method to track SCL more comprehensively (e.g., based on data retention and slow temperature variation) than traditional methodologies.

By use of various embodiment, a slow shift in voltage threshold (Vt) of a memory cell (due to SCL) can be tracked (using a feedback-control loop described herein) with better accuracy than traditional methodologies for SCL-tracking. Additionally, in comparison to traditional methodologies of tracking SCL, an embodiment described herein can use less memory space to track SCL of memory cells by obviating the need to map blocks to predefined bins to track SCL of memory cells (which is used by traditional methodologies). A feedback-control loop of an embodiment can obtain or derive an error value from a decoder (e.g., memory channel decoder) without much performance penalty (e.g., by leveraging host read operations to track SCL and minimize the system performance overhead). A feedback-control loop of an embodiment can be extended to cover various factors for slow Vt shift, such as data retention and the like. Further, a feedback-control loop of an embodiment can have a control granularity that is determined based on system resource flexibly.

As used herein, a memory device can be a non-volatile memory device, such as a NAND-type memory device that comprises multiple memory cells, each of which is configured to store data as electrical charge or voltage. A memory cell can comprise a transistor with a gate (e.g., a replacement gate or floating gate) that stores the electrical charge/voltage, and the electrical charge/voltage stored in the gate modifies voltage needed at the gate to turn the transistor. Specifically, a certain magnitude of electrical charge stored in the gate modifies the magnitude of threshold voltage of the transistor, and the threshold voltage can represent one or more units (e.g., bits) of data. The different types of memory cells support storage of different number of data units (e.g., bits). For instance, a memory cell of a memory device can be a single-level cell (SLC), a multiple-level cell (MLC), a triple-level cell (TLC), or a quad-level cell (QLC). The electrical charge stored in a memory cell that is (or used as) a SLC-type can result in a corresponding threshold voltage that represents one bit of stored data; an electrical charge stored in a memory cell that is (or used as) an MLC-type can result in a corresponding threshold voltage that represents two bits of stored data; an electrical charge stored in a memory cell that is (or used as) a TLC-type can result in a corresponding threshold voltage that represents three bits of stored data; and an electrical charge stored in a memory cell that is (or used as) a QLC-type can result in a corresponding threshold voltage that represents four bits of stored data. To read data from a memory cell, one or more read level voltages are applied to the gate of a transistor (of the memory cell) to determine (e.g., sense) the value of the current threshold voltage (e.g., the voltage at which the transistor conducts current), and the current threshold voltage value can be decoded (e.g., mapped) to a data value (e.g., bit string) stored by the memory cell. The number and values of read level voltages applied to the gate of a transistor (of a memory cell) can depending on the type of memory cell. For instance, a memory cell that is (or used as) a TLC can have seven different read level voltages, while a memory cell that is (or used as) a QLC can have fifteen read level voltages.

As used herein, a read level voltage (of a memory cell) can also be referred to as read levels or read threshold voltages. As used herein, an adjustment voltage value (or adjustment value) applied to a read level voltage (or read level) for a memory cell can be applied as a read level voltage trim or voltage trim associated with the memory cell (e.g., adjustment value is applied to the stored voltage trim).

Certain non-volatile memory devices, such as NAND-type memory devices, comprise one or more blocks, (e.g., multiple blocks), with each of those blocks comprising multiple memory cells. For instance, a block can comprise multiple pages (also referred as wordlines), with each page comprising a subset of memory cells of the memory device. A non-volatile memory device can comprise a package of one or more die, where each die can comprise one or more planes. Each plane can comprise a set of physical blocks. For some memory devices, blocks are the smallest area that can be erased. Each block can comprise of a set of pages, and each page can comprise a set of memory cells, where each memory cell can store one or more bits of data. A memory device can be a raw memory device (e.g., a NAND-type memory device), which can be managed externally, for example, by an external controller. The memory device can be a managed memory device (e.g., managed NAND-type memory device), which is a raw memory device combined with a local embedded controller for memory management within the same memory device package.

Disclosed herein are some examples of using a feedback-control loop to track SCL for a memory cell of a memory device, which can be used to adjust one or more read level voltages used to read data from the memory cell.

Figure 1:
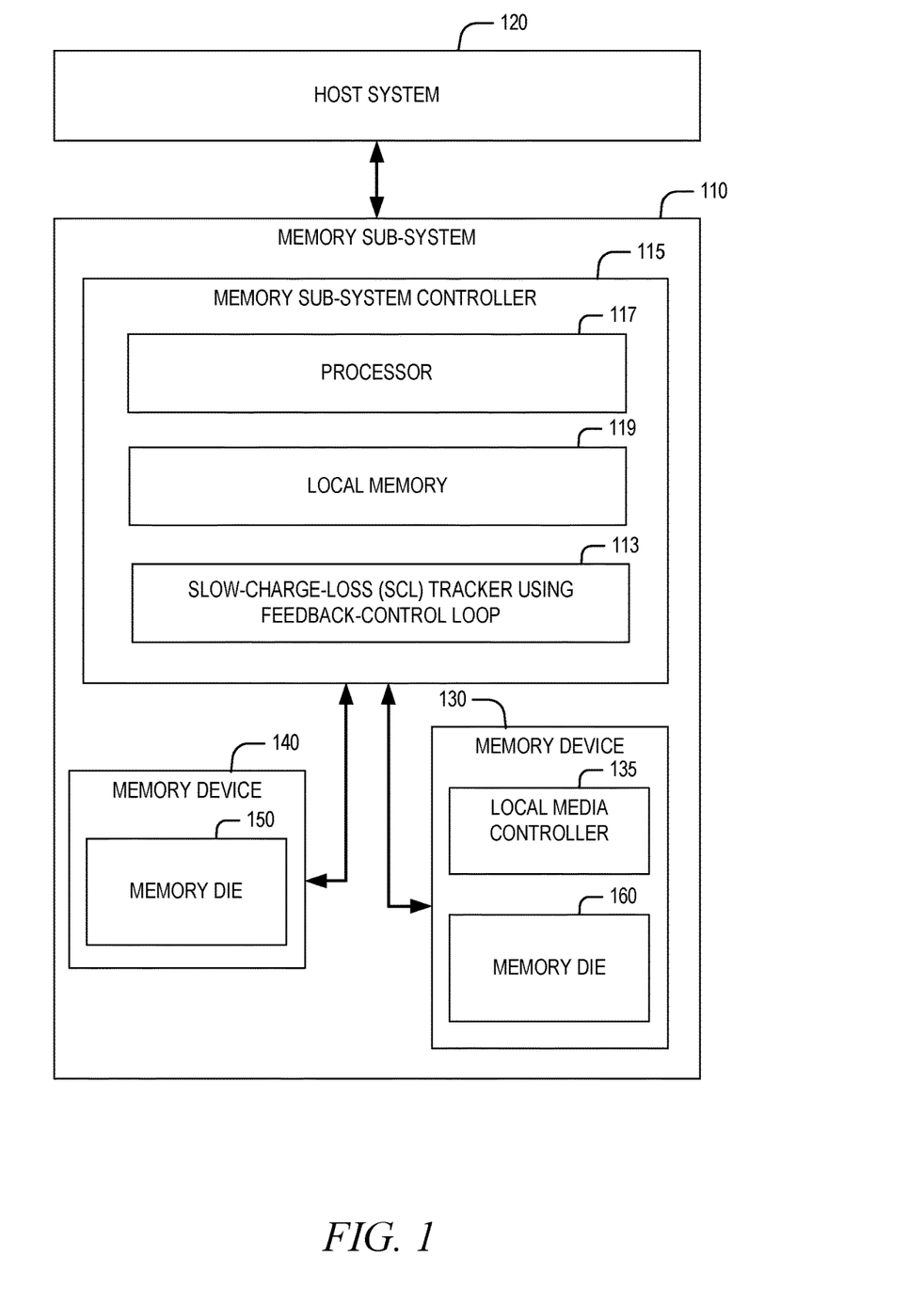
FIG. 1 is a block diagram illustrating an example computing system that includes a memory sub-system, in accordance with some embodiments of the present disclosure.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, USB interface, Fibre Channel, Serial Attached SCSI (SAS), Small Computer System Interface (SCSI), a double data rate (DDR) memory bus, a DIMM interface (e.g., DIMM socket interface that supports DDR), Open NAND Flash Interface (ONFI), DDR, Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as an MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

Each of the memory devices 130, 140 include a memory die 150, 160. For some embodiments, each of the memory devices 130, 140 represents a memory device that comprises a printed circuit board, upon which its respective memory dies 150, 160 is solder mounted.

The memory sub-system controller 115 includes a slow-charge-loss (SCL) tracker using feedback-control loop 113 (hereafter, the SCL tracker 113) that enables or facilitates the memory sub-system controller 115 to track SCL of one or more memory cells of one or both of the memory devices 130, 140, and to further adjust one or more read level voltages used to read data from the one or more memory cells. Alternatively, some or all of the SCL tracker 113 is included by the local media controller 135, thereby enabling the local media controller 135 to enable or facilitate extending read buffering in connection with a data block transfer.

Figure 2:
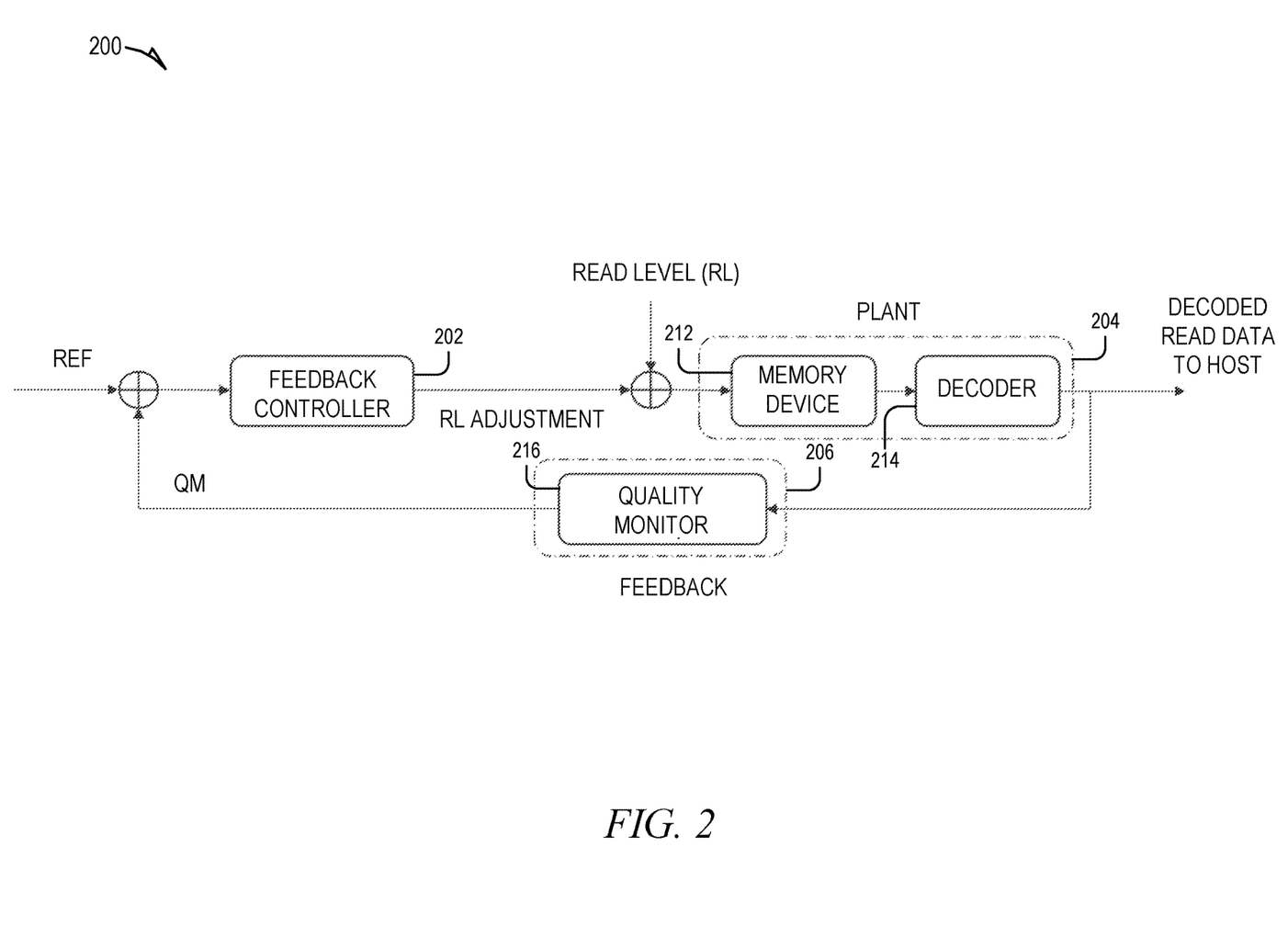
FIGS. 2 through 4 are diagrams illustrating example feedback-controller loops for tracking SCL of one or more memory cells, in accordance with some embodiments of the present disclosure.
Figure 3:
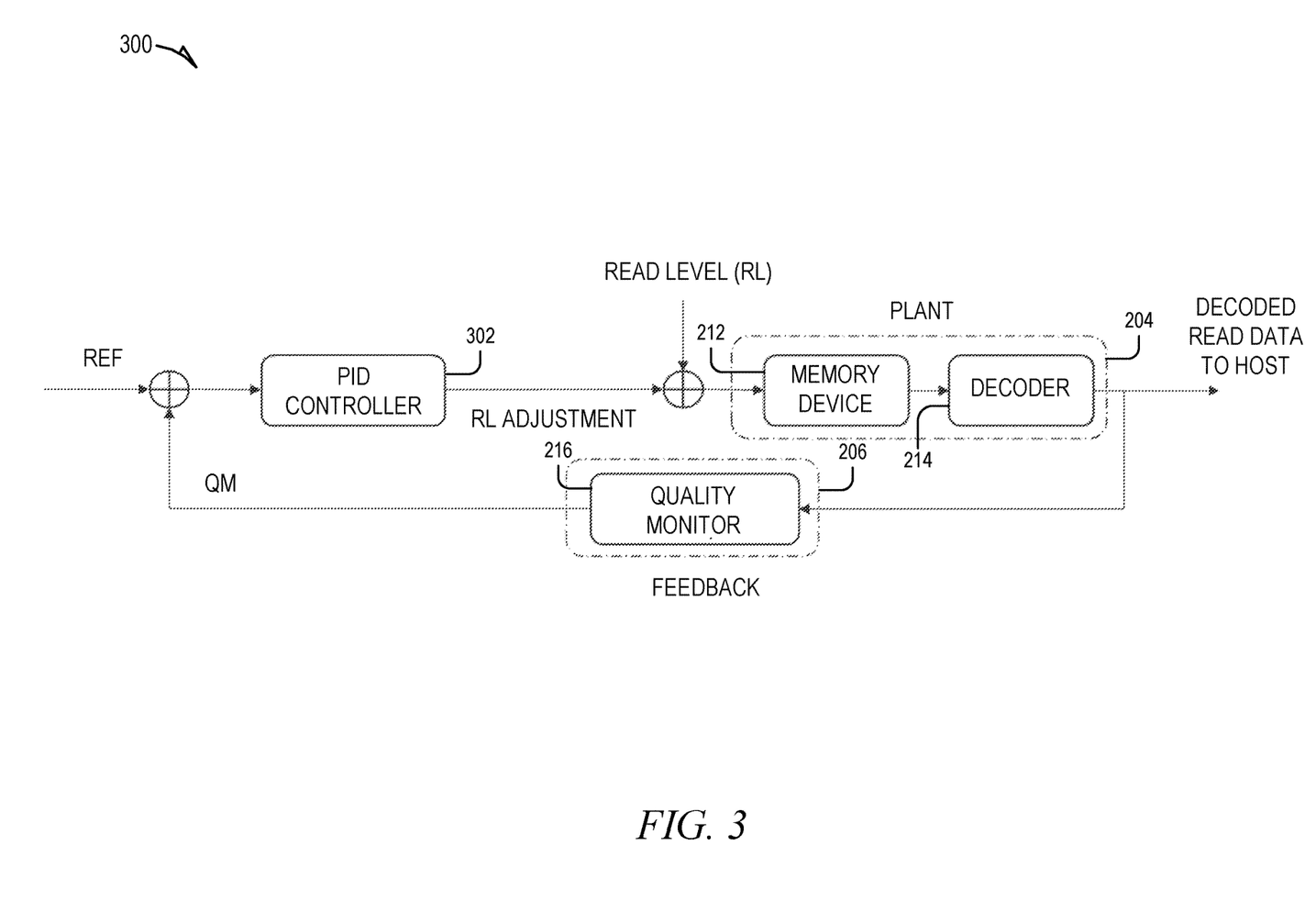
Figure 4:
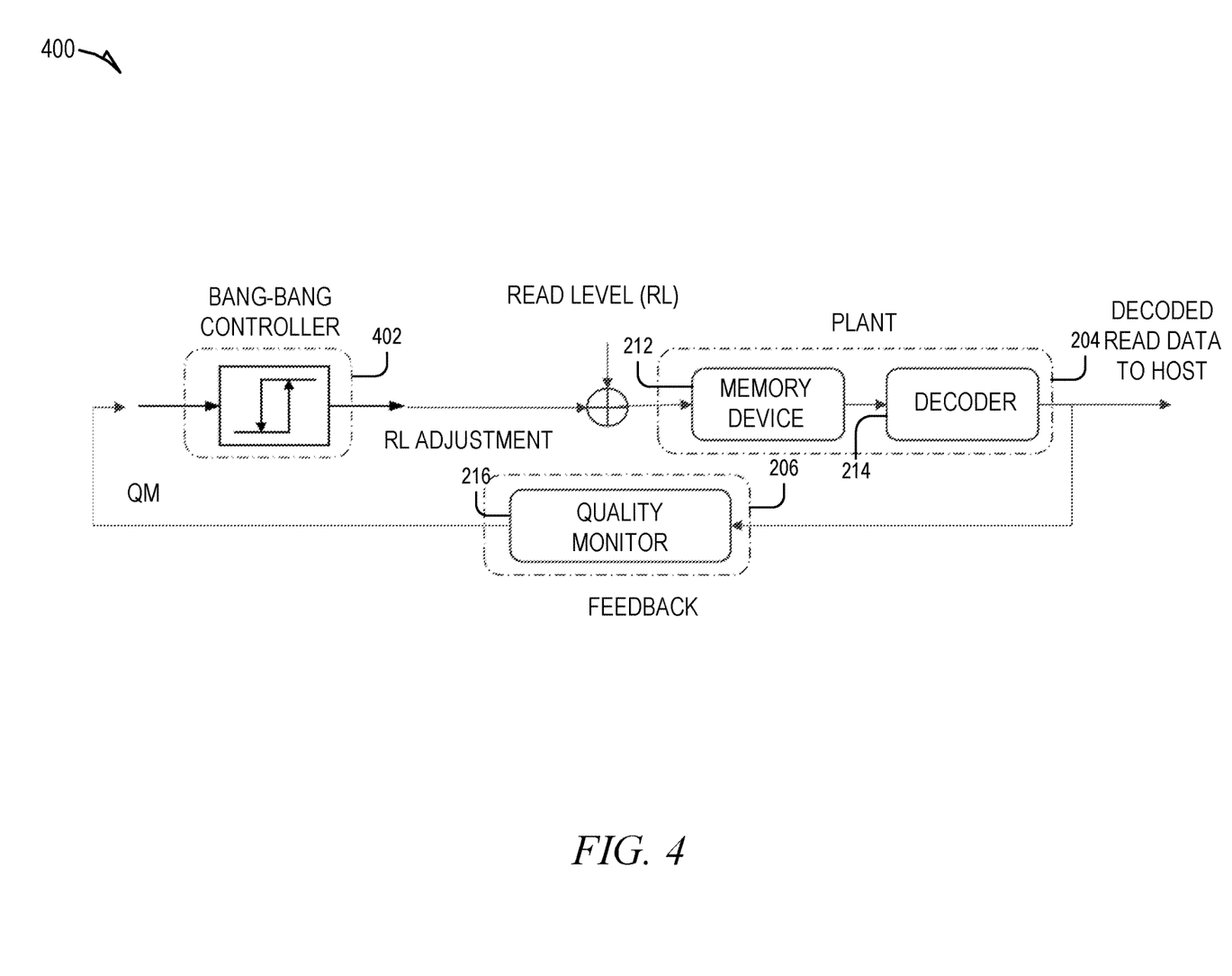

FIGS. 2 through 4 are diagrams illustrating example feedback-controller loops for tracking SCL of one or more memory cells, in accordance with some embodiments of the present disclosure. Depending on the embodiment, a memory controller of a system (e.g., the memory sub-system controller 115) can use, or implement at least a part of, one of the example feedback-controller loops to track SCL of one or more memory cells of a memory device (e.g., 130, 140 of FIG. 1) and can adjust read level voltages of the one or more memory cells based on the tracked SCL.

Referring now to FIG. 2, feedback-controller loop 200 comprises a feedback controller 202, a plant 204, and a feedback component 206. The plant 204 comprises a memory device 212 (e.g., 130, 140) and a decoder 214, which can separate from or part of a memory controller (e.g., memory sub-system controller 115). The feedback component 206 comprises a quality monitor component 216, which can generate a quality measure value associated with the decoder 214, where the quality measure value can represent the feedback of the feedback-controller loop 200. The quality measure value can be generated by the quality monitor component 216 based on decoded data outputted by the decoder 214.

As shown, a reference value and a quality measure value (generated by the feedback component 206) are combined (e.g., the quality measure value is subtracted from the reference value) and a resulting value (e.g., error value) is provided as input to the feedback controller 202. The feedback controller 202 generates a read line adjustment value based on the resulting value. During a read operation of a select memory cell of the memory device 212, the read line adjustment value can be applied to (e.g., added to or subtracted from) a baseline read level (RL) voltage value associated with the select memory cell (e.g., associated with a block that includes the select memory cell), and a resulting adjusted read level voltage value can be applied (e.g., applied with other read level voltage values) to the select memory cell to determine its current threshold voltage value. Subsequently, the decoder 214 can decode (e.g., map) the threshold voltage value to a data value, which is outputted by the decoder 214 as the decoded read data. The decoded read data can be provided to a host (e.g., 120) and can be provided to the feedback component 206. The quality monitor component 216 (of the feedback component 206) can determine (e.g., generate) a quality measure value based on the decoded read data (or additional information generated by the decoder 214 during the decoding process) and output the quality measure value for a next iteration of the loop (e.g., when a new adjusted read line voltage value can be determined for the next read operation performed on the select memory cell).

The feedback-controller loop 200 is configured to determine (e.g., place) a read level (RL) voltage value based on the quality measure value associated with decoder 214. The feedback-controller loop 200 takes advantage of a relationship between the read level voltage value and the quality measure value associated with decoder 214, and that this relationship can be dynamic based on SCL and possibly other factors, such as data retention, external temperature, read disturb and the like. In the feedback-controller loop 200, the determination (e.g., placement) of the read level voltage value can be treated as the set point. During operation of the feedback-controller loop 200, a difference between the set point and a controlled variable (the quality measure value) is determined and the resulting value (e.g., error value) is used as an input to the feedback controller 202, which determines (e.g., generates) a read level (RL) adjustment value to minimize value (e.g., reduce the difference between the set point and the controlled variable), thereby keep the read level voltage value to an optimal set point.

In FIG. 3, feedback-controller loop 300 illustrates a version of the feedback-controller loop 200 of FIG. 2 where a proportional-integral-derivative (PID) controller 302 is used as the feedback controller. For some embodiments, PID controller 302 is configured to determine the adjustment value based on proportional, integral, and derivative terms of the current error value (determined by combining the reference value with the quality measure value). In this way, the PID controller 302 can apply a correction based on proportional, integral, and derivative terms (denoted P, I, and D respectively) of the current error. A PID (or three-term) controller generally employs feedback to provide continuous modulated control.

Referring now to FIG. 4, feedback-controller loop 400 illustrate a version of the feedback-controller loop 200 of FIG. 2 where a bang-bang controller 402 is used as the feedback controller, and where the quality measure value is directly inputted into the bang-bang controller 402 (as shown). For some embodiments, a bang-bang controller is configured to switch between two states based on the quality measure value, and to determine the adjustment value based on a current state of the bang-bang controller. Additionally, depending on the quality monitor value, the feedback controller can either choose +one or −one as the adjustment value. Traditionally, a bang-bang controller (e.g., two-step or on-off controller), can switch abruptly between two states.

Figure 5:
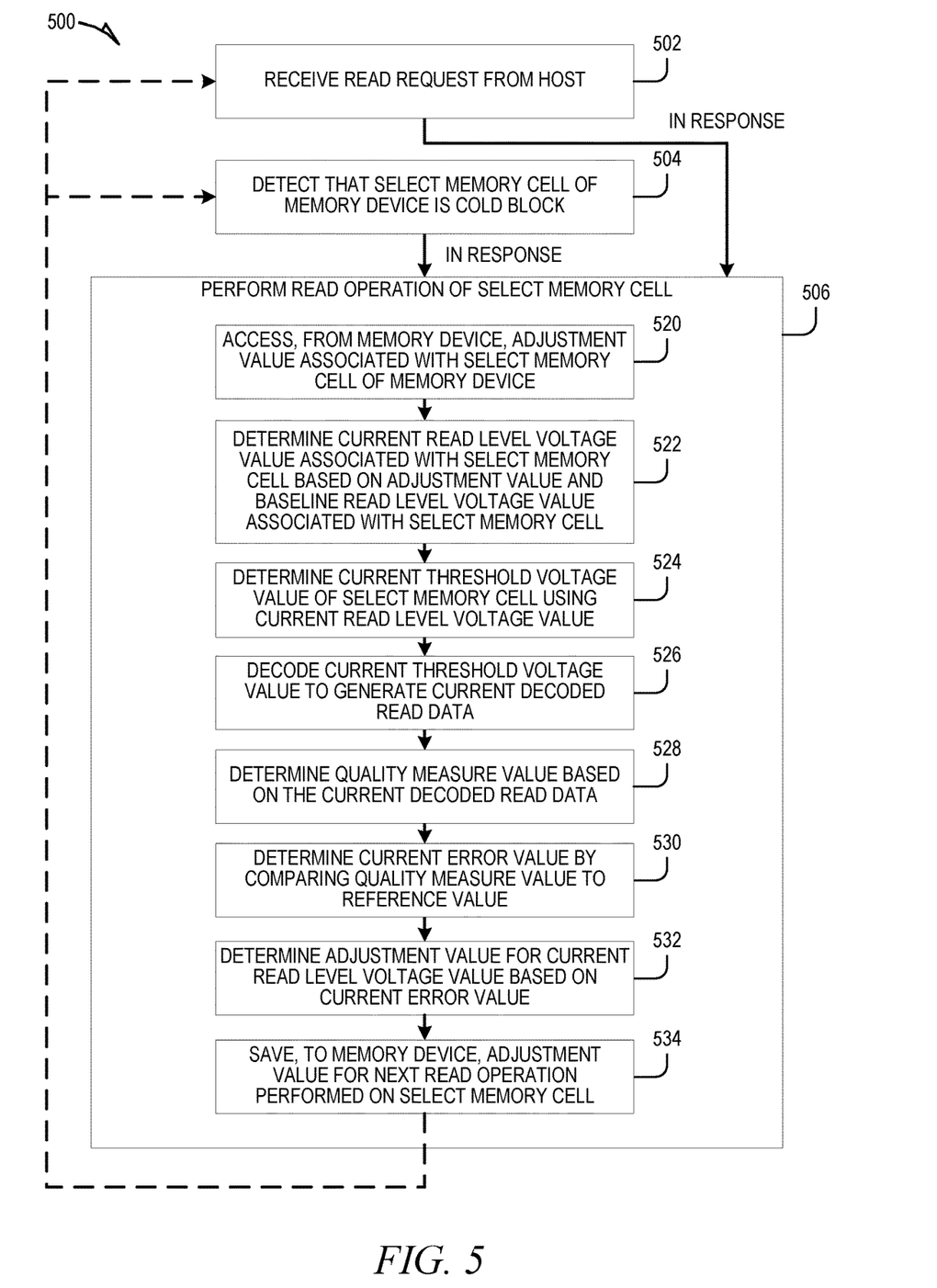
FIGS. 5 and 6 are flow diagrams of example methods for using a feedback-control loop to track SCL for a memory cell of a memory device, in accordance with some embodiments of the present disclosure.
Figure 6:
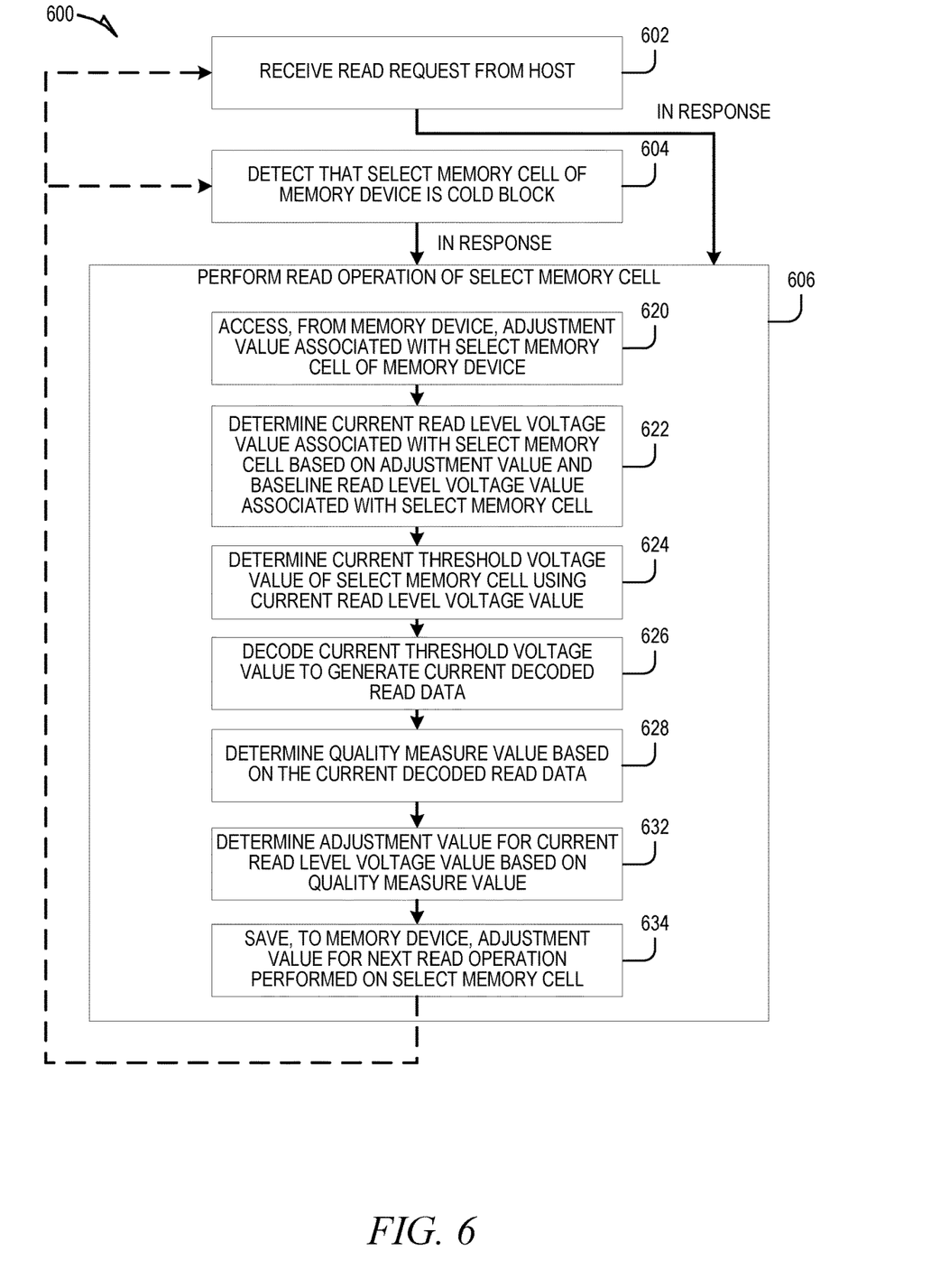

FIGS. 5 and 6 are flow diagrams of example methods for using a feedback-control loop to track SCL for a memory cell of a memory device, in accordance with some embodiments of the present disclosure. The methods 500, 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 500, 600 is performed by the memory sub-system controller 115 of FIG. 1 based on the SCL tracker 113. Additionally, or alternatively, for some embodiments, at least one of the methods 500, 600 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment; other process flows are possible.

Referring now to the method 500 of FIG. 5, the method 500 illustrates an example of using a feedback-control loop to track SCL for a memory cell of a memory device, in accordance with some embodiments, where the feedback controller of the feedback-control loop uses an error value to generate a read level voltage adjustment for the memory cell. For some embodiments, the method 500 is performed by a memory controller (e.g., the memory sub-system controller 115) that uses, or implements at least a part of, either the feedback-controller loop 200 of FIG. 2 or the feedback-controller loop 300 of FIG. 3.

At operation 502, a memory controller (e.g., the memory sub-system controller 115) receives a read request from a host (e.g., the host system 120). Alternatively, at operation 504, the memory controller detects that a select memory cell of a memory device (e.g., 130, 140) is part of a cold block, which has not been accessed in some time. For some embodiments, the cold block is detected during a scanning process (e.g., periodic scanning process) that detects for one or more cold blocks on the memory device. The scanning process (e.g., cold block scanning process) can be performed according to a schedule (e.g., a sampling schedule for tracking SCL of the select memory cell or its block) that ensures that SCL for the select memory cell and other memory cells are tracked at a frequency (e.g., cadence) that permits adjustments to read level voltages for those memory cells to track voltage threshold distribution shift. The schedule can be a user-defined schedule. Additionally, a periodic read operation based on the schedule can help avoid corner-case workloads when host operations are not enough to meet cadence requirements. Some embodiments provide a balance (e.g., user-tunable balance) between active scans for SCL tracking and host-data-read-request-based SCL tracking to ensure that the select memory cells (e.g., all memory cells or all blocks) are actively monitored for SCL tracking.

In response to receiving a read request at operation 502 or in response to the detecting that the select memory cell is part of a cold block at operation 504, the method 500 proceeds to operation 506, where the memory controller performs a read operation of the select memory cell. According to various embodiments, the memory controller performs the read operation of the select memory cell by performing one or more of operations 520 through 534.

During operation 520, the memory controller accesses, from a portion of the memory device, an adjustment value associated with the select memory cell. For example, the adjustment value can be associated with a block that includes the select memory cell and other memory cells of the memory device. For some embodiments, the portion of the memory device storing the adjustment value is a reserved portion of the memory device, which can be associated with the select memory cell or a block (of the memory device) that includes the select memory cell. For various embodiments, the adjustment value stored at the portion of the memory device was determined and saved during a prior read operation performed on the select memory cell (e.g., prior iteration of the feedback-control loop), during which operations 522 through 534 were performed.

At operation 522, the memory controller determines (e.g., places) the current read level voltage value based on the adjustment value (accessed by operation 520) and a baseline read level voltage value associated with the select memory cell. For example, the current read level voltage value can be determined by adding the adjustment value to the baseline read level voltage value, or by subtracting the adjustment value from the baseline read level voltage value. Operation 522 can represent read level placement for the select memory cell. For instance, the adjustment value can be combined with the baseline read level voltage value to generate the current read level voltage value. For some embodiments, the baseline read level voltage value is a predetermined value, which can be stored in a table on a reserved portion of the memory device. For instance, the baseline read level voltage value can be determined based on testing of the memory device and can stored on the memory device (e.g., in a table) by the manufacturer of the memory device. For various embodiments, the current read level voltage value determined by the operation 522 can be one of multiple read voltage values associated and used to read data from the select memory cell. For instance, the current read level voltage value can represent the highest read level voltage value associated with the select memory cell (e.g., because the highest Vt distributions of a memory cell tends to lose charge the fastest). For instance, where the select memory cell is a TLC, and the current read level voltage value can be associated with read level seven of the TLC. In another instance, where the select memory cell is a QLC, the current read level voltage value can be associated with read level fifteen of the QLC. According to some embodiments, once the current read level voltage value is determined, operation 522 determines one or more of the other read level voltage values associated with the select memory cell based on the current read level voltage value (or based on the adjustment value). For instance, with respect to a TLC, once the current read level voltage value associated with read level seven of the TLC is determined, operation 522 can determine read level voltage values respectively associated with read levels one through six based on the current read level voltage value (or based on the adjustment value). Thereafter, one or more of the determined read level voltages values can be used on the select memory cell (e.g., one or more of the determined read level voltages values applied to gate of the select memory cell) to determine a current threshold voltage value of the select memory cell by operation 524.

During operation 524, the memory controller (e.g., by a decoder) determines the current threshold voltage value of the select memory cell using the current read level voltage value determined by operation 522 (e.g., applying the current read level voltage to gate of the select memory cell). As described herein, one or more of the read level voltages values determined by operation 522 can be used on the select memory cell (e.g., one or more of the determined read level voltages values can be applied to gate of the select memory cell) to determine a current threshold voltage value of the select memory cell by operation 524. According to some embodiments, the one or more determined read level voltages values can be inputted (e.g., fed) into a decoder (e.g., by the memory controller) operably coupled to the memory device, and the decoder can use the one or more determined read level voltages values to determine the current threshold voltage value of the select memory cell. The decoder can be part of or separate from the memory controller.

At operation 526, the memory controller decodes (e.g., by a decoder) the current threshold voltage value (determined by operation 524) to generate current decoded read data. For some embodiments, operation 526 comprises mapping the current threshold voltage value to a data value (e.g., a 3-bit string for a TLC, and 4-bit string for a QLC), where the data value represents the current decoded read data. Accordingly, the current decoded read data can represent the data stored by (and subsequently read from) the memory cell. For some embodiments, a decoder (e.g., by the memory controller) operably coupled to the memory device can perform the decoding (e.g., mapping) the current threshold voltage value to a data value. The decoded read data can be provided to a host (e.g., 120) in response to a read request received from the host (e.g., by operation 502).

For some embodiments, prior to a subsequent read operation being performed on the select memory cell, operations 528 through 534 are performed.

During operation 528, the memory controller determines (e.g., calculates), by a feedback component of the feedback-control loop, a quality measure value (e.g., quality measure count) based on the current decoded read data. Depending on the embodiment, the quality measure value can be used as a quality monitor in a feedback-control loop described herein. For instance, the quality measure value can be used as a quality monitor value of a decoder used during operations 524 or 526. For example, the quality measure value can represent a metric of error (e.g., of the decoder) or a metric characteristic (e.g., of the decoder). For some embodiments, operation 528 comprises determining a deviation (e.g., metric of error) between the decoded read data and expected data, where parity data (e.g., associated with the decoded read data or the select memory cell) can be used to determine the deviation. Additionally, or alternatively, for some embodiments, operation 528 comprises determining a characteristic of the decoded read data. For example, the characteristic can describe a distribution of different read levels, which is expected to be equal. Depending on the embodiment, the feedback component can comprise a channel controller that can determine (e.g., calculate) the deviation between the decoded read data and the expected data, or can determine one or more characteristics of the decoded read data. For some embodiments, the feedback component is a part of the memory controller.

At operation 530, the memory controller determines a current error value (e.g., deviation or difference value) by comparing the quality measure value to a reference value. For instance, the current error value can be determined by subtracting the quality measure value from the reference value. For some embodiments, the reference value comprises a predetermined value. Additionally, the reference value can be determined based on metric type represented by the quality measure value (determined by operation 528). For instance, where the metric is error, the reference value can be 0, which can represent that the feedback-controller loop is targeting the smallest possible error. In another instance, where the metric is a characteristic, the reference value can be a gradient.

For operation 532, the memory controller determines, by a feedback controller of the feedback-control loop, the adjustment value for the current read level voltage value based on the current error value. For some embodiments, the feedback controller is (e.g., comprises) a PID controller that is configured to determine the adjustment value based on proportional, integral, and derivative terms of the current error value. As described herein, the PID controller can apply a correction based on proportional, integral, and derivative terms (denoted P, I, and D respectively) of the current error. Alternatively, for some embodiments, the feedback controller is (e.g., comprises) a bang-bang controller configured to switch between two states based on the current error value, and to determine the adjustment value based on a current state of the bang-bang controller.

During operation 534, the memory controller saves to the portion of the memory device (e.g., saved to a table on the portion), the adjustment value for a next read operation performed on the select memory cell. The adjustment value can be stored in association with the select memory cell or to a plurality of memory cells (e.g., block) that includes the select memory cell. As shown, the next read operation can be performed in response to the memory controller receiving another read request from the host at operation 502, or in response to the memory controller detecting that the select memory cell is a cold block at operation 504 (e.g., as part of an active scan process). For some embodiments, the portion of the memory device saving the adjustment value is a reserved portion. As described herein, one saved by operation 534, the adjustment value can be used in a subsequent read operation performed on the select memory cell. For instance, during the subsequent read operation, the current read level voltage value can be redetermined based the baseline read level voltage value and based on the saved adjustment value accessed (e.g., obtained or retrieved) from the portion of the memory cell. The redetermined current read level voltage value (and other read level voltage values of the select memory cell) can be used to redetermine the current threshold voltage value of the select memory, and the current threshold voltage value can be decoded (e.g., mapped to a data value) to generate new decoded read data.

Referring now to the method 600 of FIG. 6, the method 600 illustrates an example of using a feedback-control loop to track SCL for a memory cell of a memory device, in accordance with some embodiments, where the feedback controller of the feedback-control loop uses a quality measure to generate a read level voltage adjustment for the memory cell. For some embodiments, the method 600 is performed by a memory controller (e.g., the memory sub-system controller 115 of FIG. 1) that uses, or implements at least a part of, the feedback-controller loop 400 of FIG. 4.

As shown, operations 602 and 604 are similar to operation 502 and 504, and operation 606 being performed in response either operation 602 or operation 604. During operation 606, the memory controller performs a read operation of the select memory cell. According to various embodiments, the memory controller performs the read operation of the select memory cell by performing one or more of operations 620 through 632. For various embodiments, operations 620 through 628 are respectively similar to operations 520 through 528 of method 500 as described with respect to FIG. 5.

At operation 632, the memory controller determines, by a feedback controller of the feedback-control loop, the adjustment value for the current read level voltage value based on the quality measure value (determined by operation 628). For some embodiments, the feedback controller is (e.g., comprises) a bang-bang controller configured to switch between two states based on the quality measure value, and to determine the adjustment value based on a current state of the bang-bang controller. Additionally, depending on the quality monitor value, the feedback controller can either choose +one or −one as the adjustment value. Traditionally, a bang-bang controller (e.g., two-step or on-off controller), can switch abruptly between two states. If the feedback-controller loop targets a cubic-like profile, the reference value compared against the quality monitor can be zero, and hence operation 632 can determine the adjustment value based on the quality measure (unlike operation 532 of the method 500 of FIG. 5). For some embodiments, operation 634 is similar to operation 534 of method 500 as described with respect to FIG. 5.

Figure 7:
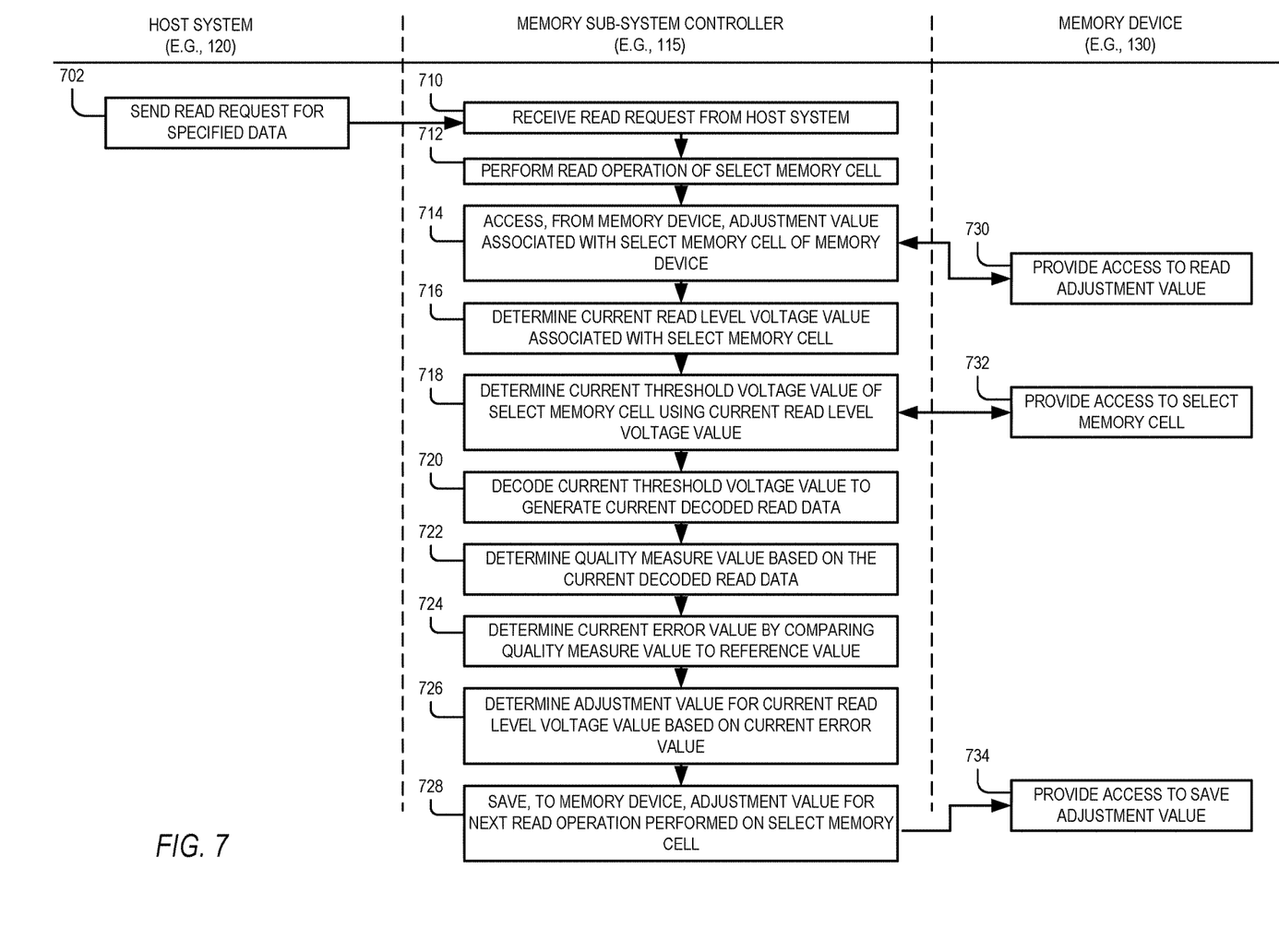
FIG. 7 provides an interaction diagram illustrating interactions between components of a computing environment in the context of some embodiments in which a method uses a feedback-control loop to track SCL for a memory cell of a memory device as described herein is performed.

FIG. 7 provides an interaction diagram illustrating interactions between components of a computing environment in the context of some embodiments in which a method uses a feedback-control loop to track SCL for a memory cell of a memory device as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 7, the host system can include the host system 120, the memory sub-system controller can include the memory sub-system controller 115, and the memory device can include the memory device 130.

As shown in FIG. 7, at operation 710, the host system 120 sends the memory sub-system 110 a read request for specified data at operation 702, and the memory sub-system controller 115 receives the read request from the host system 120 at operation 710. In response to the read request, the memory sub-system controller 115 can determine that a select memory of the memory device 130 stores the specified data and, accordingly, at operation 712, the memory sub-system controller 115 performs a read operation on the select memory cell. For some embodiments, during performance of the read operation, operations 714 through 728 are performed.

At operation 714, the memory sub-system controller 115 accesses, from a portion (e.g., reserved portion) of the memory device, an adjustment value associated with the select memory cell. To facilitate this, at operation 730, the memory device 130 provides the memory sub-system controller 115 access to read the adjustment value. During operation 716, the memory sub-system controller 115 determines (e.g., places) the current read level voltage value based on the adjustment value and a baseline read level voltage value associated with the select memory cell. At operation 718, the memory sub-system controller 115 determines the current threshold voltage value of the select memory cell using the current read level voltage value. To facilitate this, at operation 732, the memory device 130 provides the memory sub-system controller 115 with access to read the select memory cell.

After the current threshold voltage value is determined, at operation 720, the memory sub-system controller 115 decodes (e.g., maps) the current threshold voltage value to generate current decoded read data. At operation 722, the memory sub-system controller 115 determines a quality measure value (e.g., quality measure count) based on the current decoded read data. The memory sub-system controller 115, at operation 724, determines a current error value by comparing the quality measure value to a reference value (e.g., subtracting the quality measure value from the reference value). Based on the current error value, at operation 726, the memory sub-system controller 115 determines the adjustment value for the current read level voltage value based on the current error value. Thereafter, at operation 728, the memory sub-system controller 115 saves, to the portion of the memory device 130, the adjustment value for a next read operation performed on the select memory cell. To facilitate this, at operation 734, the memory device 130 provides the memory sub-system controller 115 access to save the adjustment value, thereby replacing an old version of the adjustment value with a new/updated version of the adjustment value.

Figure 8:
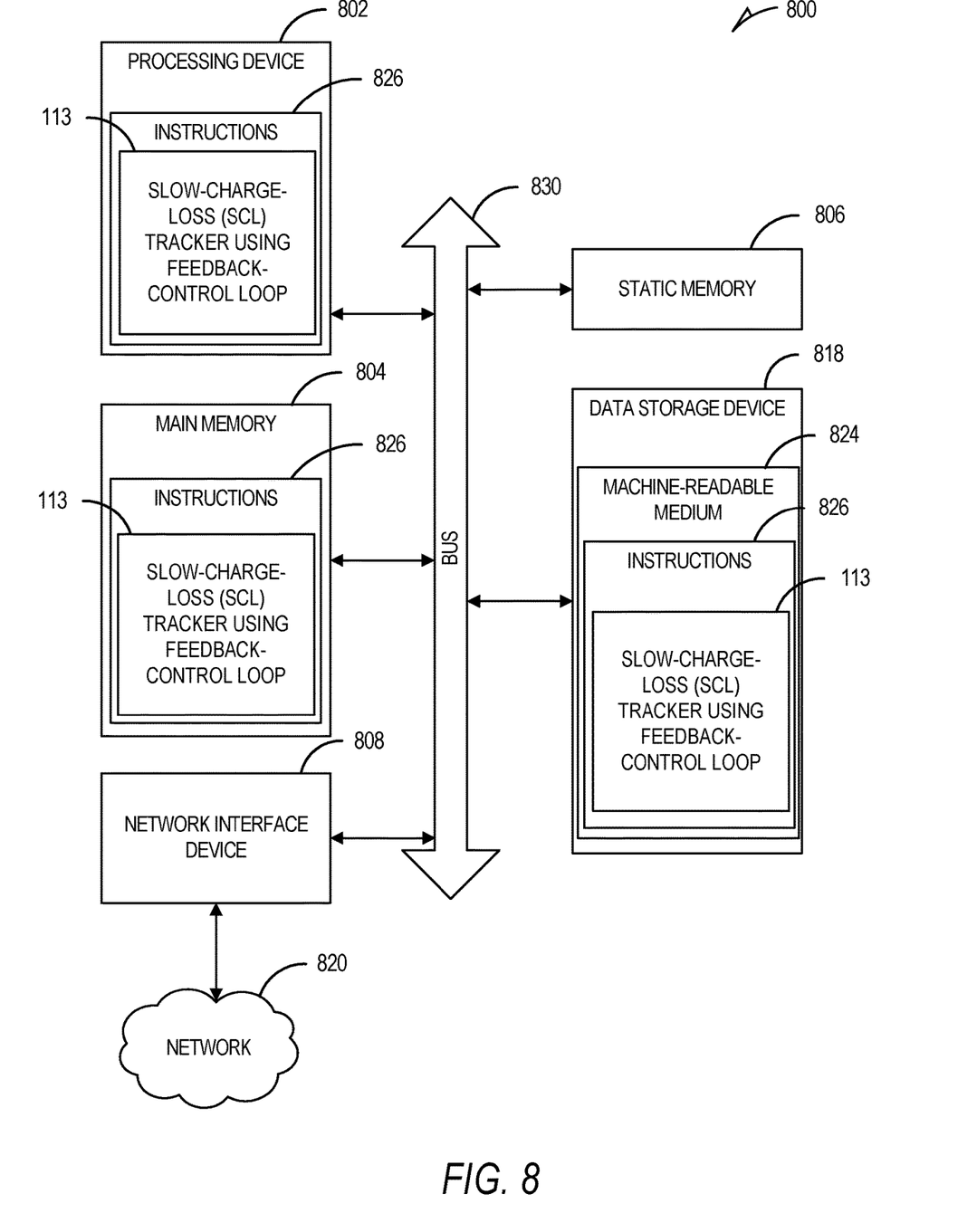
FIG. 8 is a block diagram of an example computer system in which embodiments of the present disclosure may operate.

FIG. 8 illustrates an example machine in the form of a computer system 800 within which a set of instructions can be executed for causing the machine to perform any one or more of the methodologies discussed herein. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., ROM, flash memory, DRAM such as SDRAM or Rambus DRAM (RDRAM), etc.), a static memory 806 (e.g., flash memory, static random-access memory (SRAM), etc.), and a data storage device 818, which communicate with each other via a bus 830.

The processing device 802 represents one or more general-purpose processing devices such as a microprocessor, a central processing unit, or the like. More particularly, the processing device 802 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 802 can also be one or more special-purpose processing devices such as an application-specific integrated circuit (ASIC), a field programmable gate array (FPGA), a digital signal processor (DSP), a network processor, or the like. The processing device 802 is configured to execute instructions 826 for performing the operations and steps discussed herein. The computer system 800 can further include a network interface device 808 to communicate over a network 820.

The data storage device 818 can include a machine-readable storage medium 824 (also known as a computer-readable medium) on which is stored one or more sets of instructions 826 or software embodying any one or more of the methodologies or functions described herein. The machine-readable storage medium 824 can be non-transitory in nature. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage device 818, and/or main memory 804 can correspond to the memory sub-system 110 of FIG. 1.

In one embodiment, the instructions 826 include instructions to implement functionality corresponding to tracking SCL of one or more memory cells of a memory device as described herein (e.g., the SCL tracker 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a memory controller operatively coupled to the memory device, the memory controller being configured to use a feedback-control loop to adjust a current read level voltage value for a select memory cell of the memory device, the memory controller performing operations comprising:
  processing a first read operation on the select memory cell, the processing of the first read operation comprising:
    determining a first threshold voltage value of the select memory cell using a current read level voltage value, the current read level voltage value being determined based on a baseline read level voltage value associated with the select memory cell;
    decoding the first threshold voltage value to generate first decoded read data;
    determining, by a feedback component of the feedback-control loop, a quality measure value based on the first decoded read data;
    determining a current error value by comparing the quality measure value to a reference value; and
    determining, by a feedback controller of the feedback-control loop, an adjustment value for the current read level voltage value based on the current error value; and
  processing a second read operation on the select memory cell using the current read level voltage value, the processing of the second read operation comprising:
    redetermining the current read level voltage value based on the adjustment value and the baseline read level voltage value;
    determining a second threshold voltage value of the select memory cell using the current read level voltage value; and
    decoding the second threshold voltage value to generate second decoded read data.

2. The system of claim 1, wherein the feedback controller is a proportional-integral-derivative controller configured to determine the adjustment value based on proportional, integral, and derivative terms of the current error value.

3. The system of claim 1, wherein the feedback controller is a bang-bang controller configured to switch between two states based on the current error value, and to determine the adjustment value based on a current state of the bang-bang controller.

4. The system of claim 1, wherein the system is a memory sub-system, and wherein the first read operation is performed in response to a read request received by the memory sub-system from a host.

5. The system of claim 4, wherein the operations comprise:
after the decoding of the first threshold voltage value, providing the first decoded read data to the host.

6. The system of claim 1, wherein the first read operation is performed periodically based on a sampling schedule for tracking slow charge loss of the first memory cell.

7. The system of claim 1, wherein the select memory cell is part of a plurality of memory cells of the memory device, and wherein the first read operation is performed periodically based on a sampling schedule for tracking slow charge loss of the plurality of memory cells.

8. The system of claim 1, wherein the first read operation is performed as part of a scan process performed by the memory controller on one or more cold blocks of the memory device, and wherein the one or more cold blocks comprise the select memory cell.

9. The system of claim 1, wherein the select memory cell stores a charge state representing a plurality of data bits, and wherein the current read level voltage value is associated with highest read level used in reading data from the select memory cell.

10. The system of claim 1, wherein the determining of the quality measure value based on the first decoded read data comprises at least one of:
determining a deviation between the first decoded read data and expected data based on parity data associated with the select memory cell; or
determining a characteristic of the first decoded read data.

11. The system of claim 1, wherein the select memory cell stores a charge state representing a plurality of data bits, wherein the current read level voltage value is associated with one read level of a plurality of read levels used for reading data from the select memory cell, and wherein the operations comprise:
after the adjustment value is determined by the feedback controller, determining another read level voltage value based on the adjustment value for the current read level voltage value, the other read level voltage value being associated with another read level of the plurality of read levels used for reading data from the select memory cell, the determining of the first threshold voltage value of the select memory cell using the current read level voltage value comprising:
  determining the first threshold voltage value of the select memory cell using the current read level voltage value and the other read level voltage value.

12. The system of claim 1, wherein the operations comprising:
after the adjustment value is determined by the feedback controller, storing the adjustment value in a reserved portion of the memory device.

13. The system of claim 12, wherein the select memory cell is used as a block that stores a charge state representing a plurality of data bits, wherein the current read level voltage value is associated with one read level of a plurality of read levels used for reading data from the select memory cell, and wherein the operations comprise:
after the adjustment value is stored in the reserved portion:
  accessing the adjustment value from the reserved portion;
  determining another read level voltage value based on the accessed adjustment value, the other read level voltage value being associated with another read level of the plurality of read levels used for reading data from the select memory cell, the determining of the first threshold voltage value of the select memory cell using the current read level voltage value comprising:
    determining the first threshold voltage value of the select memory cell using the current read level voltage value and the other read level voltage value.

14. The system of claim 1, wherein the select memory cell is a triple-level cell (TLC), and wherein the current read level voltage value is associated with read level seven of the TLC.

15. The system of claim 1, wherein the select memory cell is a quad-level cell (QLC), and wherein the current read level voltage value is associated with read level fifteen of the QLC.

16. The system of claim 1, wherein the memory device comprises a three-dimensional (3D) NAND-based memory device.

17. At least one non-transitory machine-readable storage medium comprising instructions that, when executed by a memory controller of a memory sub-system, cause the memory controller to perform operations comprising:
  processing a first read operation for a select memory cell of a memory device of the memory sub-system, the memory controller being configured to use a feedback-control loop to adjust a current read level voltage value for the select memory cell, the processing of the first read operation comprising:
    determining a first threshold voltage value of the select memory cell using a current read level voltage value, the current read level voltage value being determined based on a baseline read level voltage value associated with the select memory cell;
    decoding the first threshold voltage value to generate first decoded read data;
    determining, by a feedback component of the feedback-control loop, a quality measure value based on the first decoded read data; and
    determining, by a feedback controller of the feedback-control loop, an adjustment value for the current read level voltage value based on the quality measure value; and
  processing a second read operation on the select memory cell using the current read level voltage value, the processing of the second read operation comprising:
    redetermining the current read level voltage value based on the adjustment value and the baseline read level voltage value;
    determining a second threshold voltage value of the select memory cell using the current read level voltage value; and
    decoding the second threshold voltage value to generate second decoded read data.

18. The at least one non-transitory machine-readable storage medium of claim 17, wherein the feedback controller is a bang-bang controller configured to switch between two states based on the quality measure value, and to determine the adjustment value based on a current state of the bang-bang controller.

19. A method comprising:
  processing, by a memory controller of a memory sub-system, a current read operation for a select memory cell of a memory device of the memory sub-system, the memory controller being configured to use a feedback-control loop to adjust a current read level voltage value for the select memory cell, the processing of the current read operation comprising:
    accessing, from a portion of the memory device, an adjustment value associated with the select memory cell;
    determining the current read level voltage value based on the adjustment value and a baseline read level voltage value associated with the select memory cell;
    determining a current threshold voltage value of the select memory cell using the current read level voltage value;
    decoding the current threshold voltage value to generate current decoded read data;
    determining, by a feedback component of the feedback-control loop, a quality measure value based on the current decoded read data;
    determining a current error value by comparing the quality measure value to a reference value;
    determining, by a feedback controller of the feedback-control loop, the adjustment value for the current read level voltage value based on the current error value; and
    saving, to the portion of the memory device, the adjustment value for a next read operation performed on the select memory cell.

* * * * *